(12) United States Patent
Howard

(10) Patent No.: US 11,266,122 B1
(45) Date of Patent: Mar. 8, 2022

(54) PET IMMOBILIZER SYSTEM

(71) Applicant: John M. Howard, Arlington, TX (US)

(72) Inventor: John M. Howard, Arlington, TX (US)

( * ) Notice: Subject to any disclaimer, the term of this patent is extended or adjusted under 35 U.S.C. 154(b) by 0 days.

(21) Appl. No.: 17/325,132

(22) Filed: May 19, 2021

Related U.S. Application Data

(60) Provisional application No. 63/132,076, filed on Dec. 30, 2020.

(51) Int. Cl.
*A01K 15/04* (2006.01)

(52) U.S. Cl.
CPC .................................. *A01K 15/04* (2013.01)

(58) Field of Classification Search
CPC .... A01K 15/04; A01K 13/006; A01K 15/021; A01K 27/001; A01K 27/002; A01K 27/009
USPC .................. 119/814–820, 850–856, 712–721
See application file for complete search history.

(56) References Cited

U.S. PATENT DOCUMENTS

| | | | |
|---|---|---|---|
| 1,685,435 A | 9/1928 | Philbrick | |
| 3,994,264 A | 11/1976 | Flynt | |
| 4,413,588 A | 11/1983 | Lindholm et al. | |
| 5,421,760 A | 6/1995 | Blaga | |
| 5,692,933 A | 12/1997 | Bradley et al. | |
| 6,659,046 B2 | 12/2003 | Schmid et al. | |
| 6,659,824 B1* | 12/2003 | McCormick | B63C 9/081 441/106 |
| 6,659,825 B2 | 12/2003 | Foss | |
| 6,843,694 B2 | 1/2005 | Simmons | |
| 6,976,453 B2* | 12/2005 | Goudal | A01K 13/006 119/712 |
| 7,160,167 B2 | 1/2007 | Peters | |
| 7,559,817 B2* | 7/2009 | Von Zell | B63C 9/115 441/123 |
| 8,881,687 B2 | 11/2014 | Colagelo et al. | |
| 10,598,828 B2 | 3/2020 | Denning | |
| 2007/0181080 A1* | 8/2007 | Gibson | A01K 27/001 119/815 |
| 2011/0030623 A1 | 2/2011 | Colangelo | |
| 2011/0132275 A1* | 6/2011 | Huo | A01K 27/009 119/720 |
| 2017/0006834 A1* | 1/2017 | Waters | A01K 27/009 |

* cited by examiner

*Primary Examiner* — Yvonne R Abbott-Lewis
(74) *Attorney, Agent, or Firm* — Invention To Patent Services; Alex Hobson

(57) ABSTRACT

A pet immobilizing system utilizes a vest to located a bladder between a pet's legs. The bladder is rapidly inflated to hinder the pet's movement or to immobilize the pet. A remote electronic device sends a wireless signal to a wireless signal receiver coupled with the pressure source to activate inflation of the bladder. A pressure source may be canister or chemical inflation pressure source that produces an inflation fluid from the reaction of two or more chemicals, A vest may include a waist portion that extends around the pet's waist. A bladder compartment may be configured in the vest for retaining the bladder. A bladder compartment may have an opening to direct the inflation of the bladder out between the pet's legs. A remote electronic device may be a mobile phone that operates an App with an activation button to initiate inflation of the bladder.

18 Claims, 4 Drawing Sheets

PET IMMOBILIZER SYSTEM

CROSS REFERENCE TO RELATED APPLICATIONS

This application claims the benefit of priority to U.S. provisional patent application No. 63/132,076, filed on Dec. 30, 2020.

BACKGROUND OF THE INVENTION

Field of the Invention

The invention relates to a pet immobilizer system that employs a bladder configured between the pet's rear legs, whereby inflation of the bladder effectively hampers the pet's movement.

Background

There are many circumstances where a pet owner may want to restrict the movement of their pet. For example, a dog off leash in the yard may start to dart into the road when an oncoming car is approaching. In another example, a dog at a dog park may become aggressive with another dog and it may be desired to quickly and effectively restrict the dog's movement to deescalate the situation. If the dogs are already fighting restricting the movement may quickly end the incident.

SUMMARY OF THE INVENTION

The invention is directed to a pet immobilizing system that utilizes a vest to located a bladder between a pet's legs, such as between the rear legs of a dog. The bladder may be coupled with the vest and to a pressure source. A remote electronic device may send a wireless signal to a wireless signal receiver coupled with the pressure source to activate inflation of the bladder. A canister or chemical inflation pressure source may then rapidly fill the bladder to restrict movement of the pet.

An exemplary vest may be donned on the pet to locate the uninflated bladder between the pet's legs, or proximal to a space between their legs. A vest may comprise a waist portion that extends around the pet's waist and may have a bladder compartment for receiving and retaining the bladder. An exemplary waist portion of a vest may have a first and second waist extensions that couple together via a waist connector to enable quick donning and removal. A waist connector may comprise a strap, buckle and/or hook and loop fasteners to allow a proper fit and to allow quick coupling and decoupling of the waist portion around the pet. An exemplary vest comprises a front portion that extends around a neck of the pet. A front portion may ensure proper location of the bladder with respect to the pet. A front portion may have a first front portion and a second front portion that are coupled together by a front connector to form the front portion. As with the waist connector, a front connector may comprise a strap, buckle and/or hook and loop fastener for quick adjustment of the size and fit and for quick donning and removal.

An exemplary pressure source may be a canister of container of pressurized fluid, such as a gas. The gas may be air, carbon dioxide and the like. The pressure source may be coupled to the vest and the vest may have a pocket or straps to retain the pressure source. A fluid conduit may extend from the pressure source to the bladder, such as a hose or tubing. A pressure canister may be configured proximal to the pet's back and the fluid conduit may extend down to the bladder configured on the underbelly of the pet, and preferably between the pet's back legs.

An exemplary vest may have a bladder compartment having a bladder compartment closure that is released and opens when the bladder inflates. A bladder compartment closure may be held closed by hook and loop fastener, for example. The bladder compartment may retain a portion of the bladder and may direct the inflated bladder to expand between the pet's legs. An opening in the bladder compartment may be on the back side, wherein inflation of the bladder projects the bladder out back between the pet's legs.

An exemplary pressure source may be a chemical pressure source, wherein reaction of chemicals produces a gas. For example, many airbags have a chemical inflation system that reacts sodium azide with potassium nitrate (KNO3) to produce nitrogen gas. The chemical pressure source may have two or more chemicals separated and when the activation wireless signal is received by the controller, the chemicals may mix, such as by an activator that ruptures one or more of the chemical enclosures. The chemicals may then mix and release a burst of gas.

A bladder may be reusable bladder or a disposable bladder. A bladder may be an elastic material that stretches upon inflation or thin fabric that is folded or otherwise compressed and then simply expands. An exemplary bladder may be a film of plastic, a coated fabric or a composite material.

An exemplary bladder may be configured to effectively hinder and restrict movement of a pet, such as a dog, and the bladder may be sized for the size of the dog. Very small dogs may require a bladder with an inflated volume of about 1,500 cc, or have a diameter of about 14 cm, whereas a large dog may require a bladder with a volume of about 8,000 cc or a diameter of about 25 cm. An exemplary bladder may have a volume when effectively filled by the pressure source of about 1,000 cc or more, about 4,000 cc or more, about 6,000 cc or more, about 8,000 cc or more, about 10,000 cc or more, about 14,000 cc or more any range between and including the volumes provided. Likewise, an exemplary bladder may have a diameter when effectively filled by the pressure source of about 15 cm or more about 20 cm or more about, about 25 cm or more, about 30 cm or more and any range between and including the diameter values provided.

An exemplary remote electronic device may be a mobile phone and the phone may run an App, or program, to enable a wireless signal to be transmitted when desired. The controller may comprise a microprocessor that recognizes the wireless signal and initiates inflation of the bladder. The wireless signal may be a short-range wireless signal, such as a Bluetooth signal, for example. A short-range signal may have a range of 100 meters or more, about 150 meters or more, about 200 m or more and any range between and including the ranges provided. Three classes of Bluetooth devices have the following performance: Class 1, transmitting at 100 mW with a range of 100 meters (328 feet); Class 2 transmitting at 2.5 mW with a range of 10 meters (33 feet); and Class 3 transmitting at 1 mW with a range of fewer than 10 meters. Class 1 may be preferred for the pet immobilizer system.

Definitions

A pressure source, as used herein, is defined as a device that provides rapid inflation of the bladder, wherein the bladder is inflated to effectively hamper the pets, movement within about 3 seconds or less and preferably within 2 seconds or less and even more preferably within 1 second or less.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
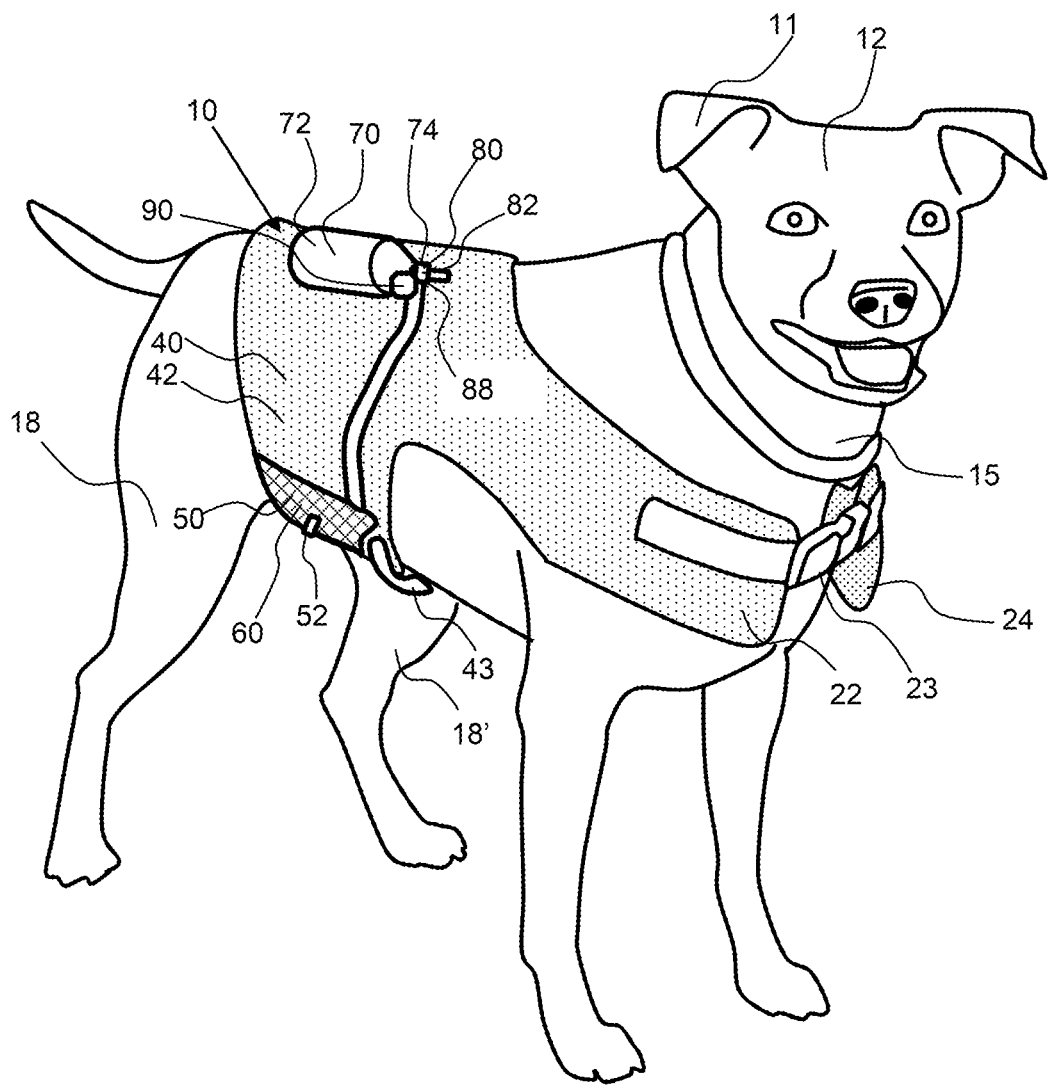
FIG. 1 shows a perspective view of a dog with an exemplary pet immobilizer system coupled around their waist and extending around their neck and a bladder coupled to a pressure canister to inflate the bladder.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
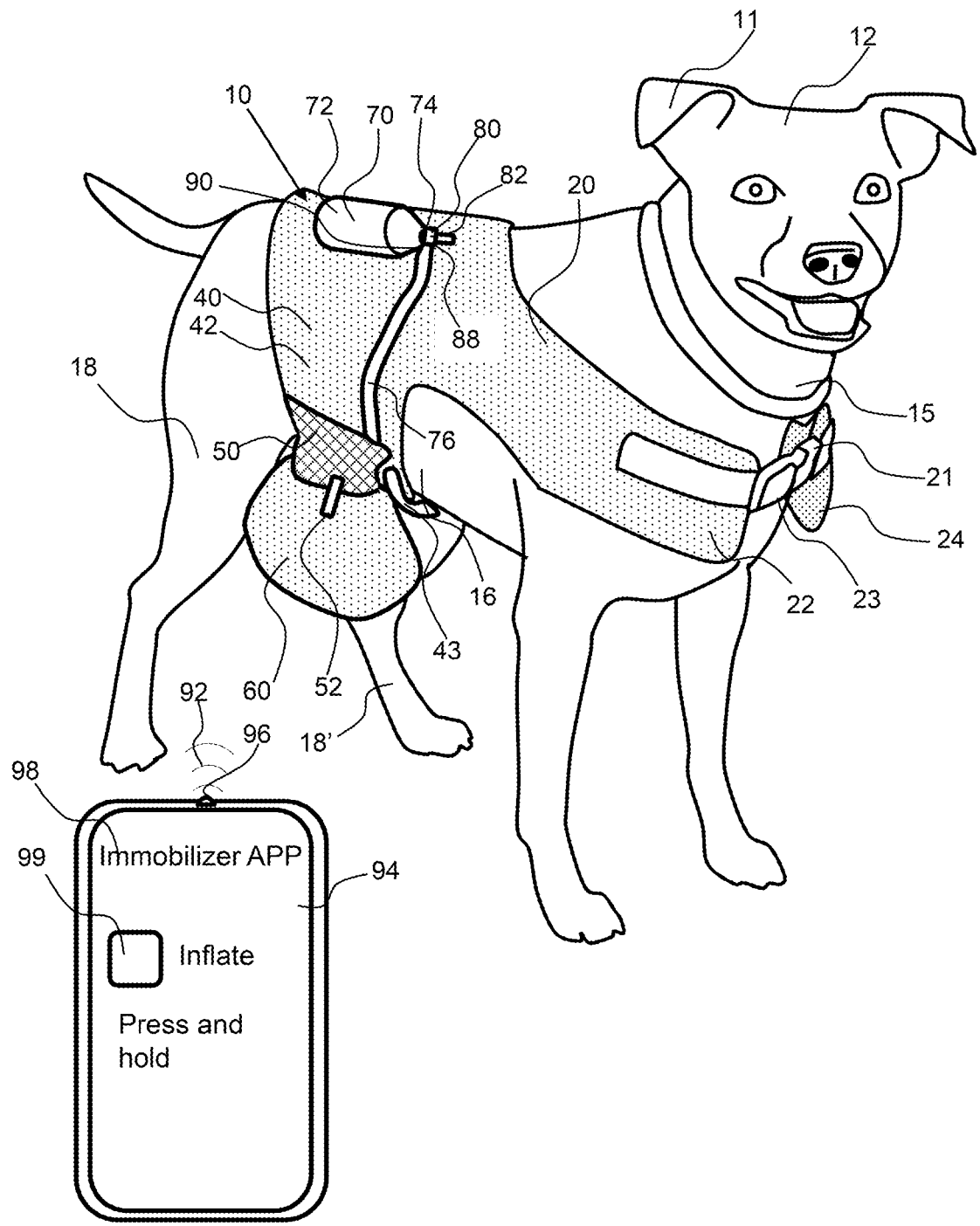
FIG. 2 shows a perspective view of a dog shown in FIG. 1 with the bladder now inflated to immobilize the dog.

Referring to FIGS. 1 and 2, an exemplary pet immobilizer system 10 is coupled to a dog 12, an example of a pet 11, via a vest 20 that has a waist portion 40 extending around the dog's waist 16 and a front portion 21 extending around the neck 15 or front of the dog. The waist portion has two waist extensions 42 that extend around the dog's waist and are coupled together by a waist connector 43. The front portion 21 of the vest 20 has a first front portion 22 and second front portion 24 that are coupled together by a front connector 23, such as a strap and buckle. Note that the front portions and or waist extensions may be coupled together by hook and loop fasteners, as described herein. The vest may be donned on the dog with the first and second front extensions connected and the waist extensions connected to provide a secure fit on the dog.

A bladder 60 is configured in a bladder compartment 50 and located on the underside of the waist 16 of the dog. The bladder compartment may be closed by a bladder compartment closure 52 that releases when the bladder is inflated by pressure source 70, such as the pressure canister 72. A fluid conduit 76 extends from the pressure source to the bladder to enable a rapid flow of fluid into the bladder for inflation. A valve 82 may be controlled by a controller 90 that receives a signal from a wireless signal receiver 88 to initiate flow of the fluid to the bladder. As shown in FIG. 2, a remote electronic device 94, such as a mobile phone, may have a user interface 98, such as an App, with an activation button 99, to initiate the inflation of the bladder. When a user interfaces with the activation button, the remote device may send a wireless signal 92 via a wireless signal transmitter 96 to the wireless signal receiver 88. The controller 90 may then open the valve 82 to inflate the bladder. A pressure regulator 80 may be conjured to control the pressure of inflation of the bladder. As shown in FIG. 2, the inflated bladder is configured between the dog's back legs 18, 18'.

Figure 3:
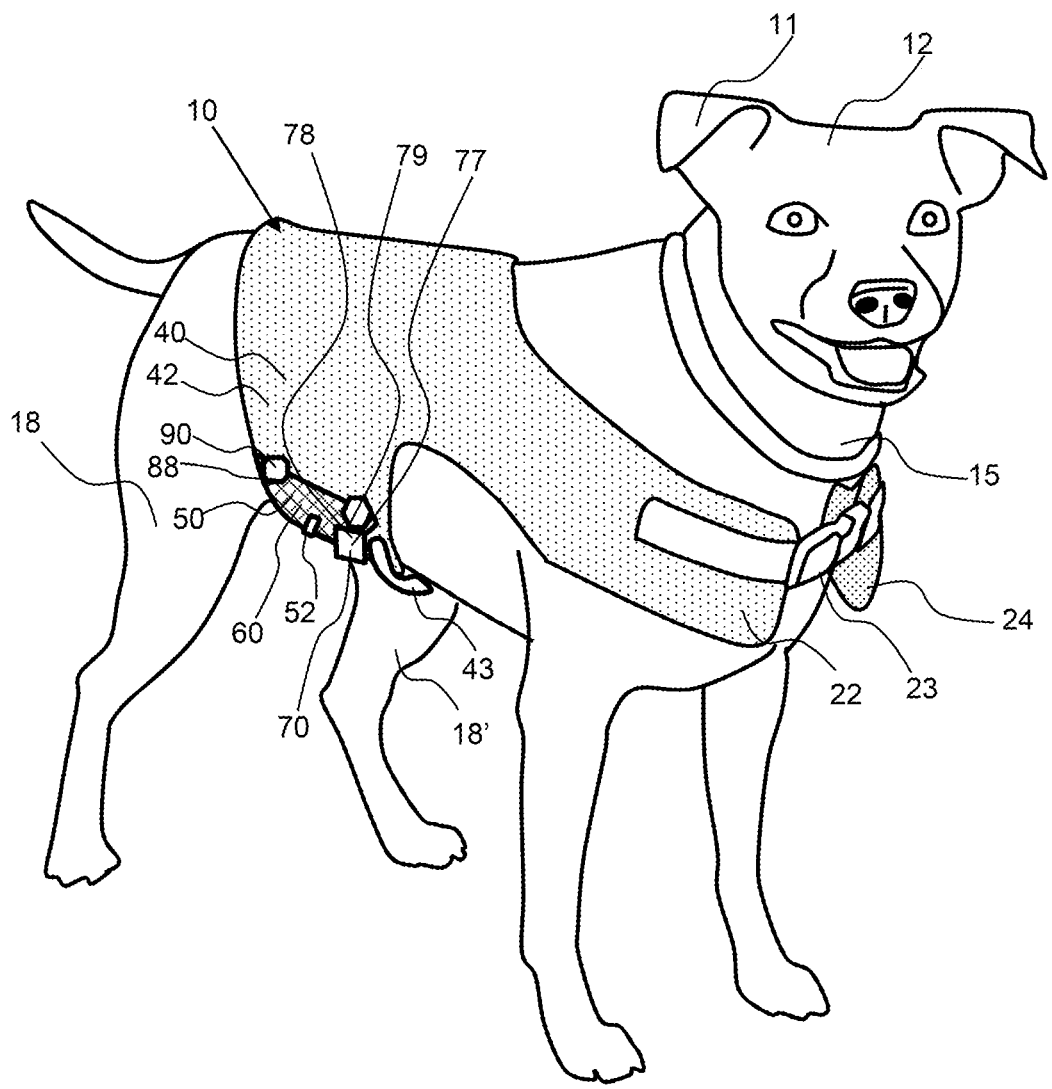
FIG. 3 shows a perspective view of a dog with an exemplary pet immobilizer system coupled around their waist and extending around their neck and chemical pressure source coupled with the bladder to inflate the bladder.
Figure 4:
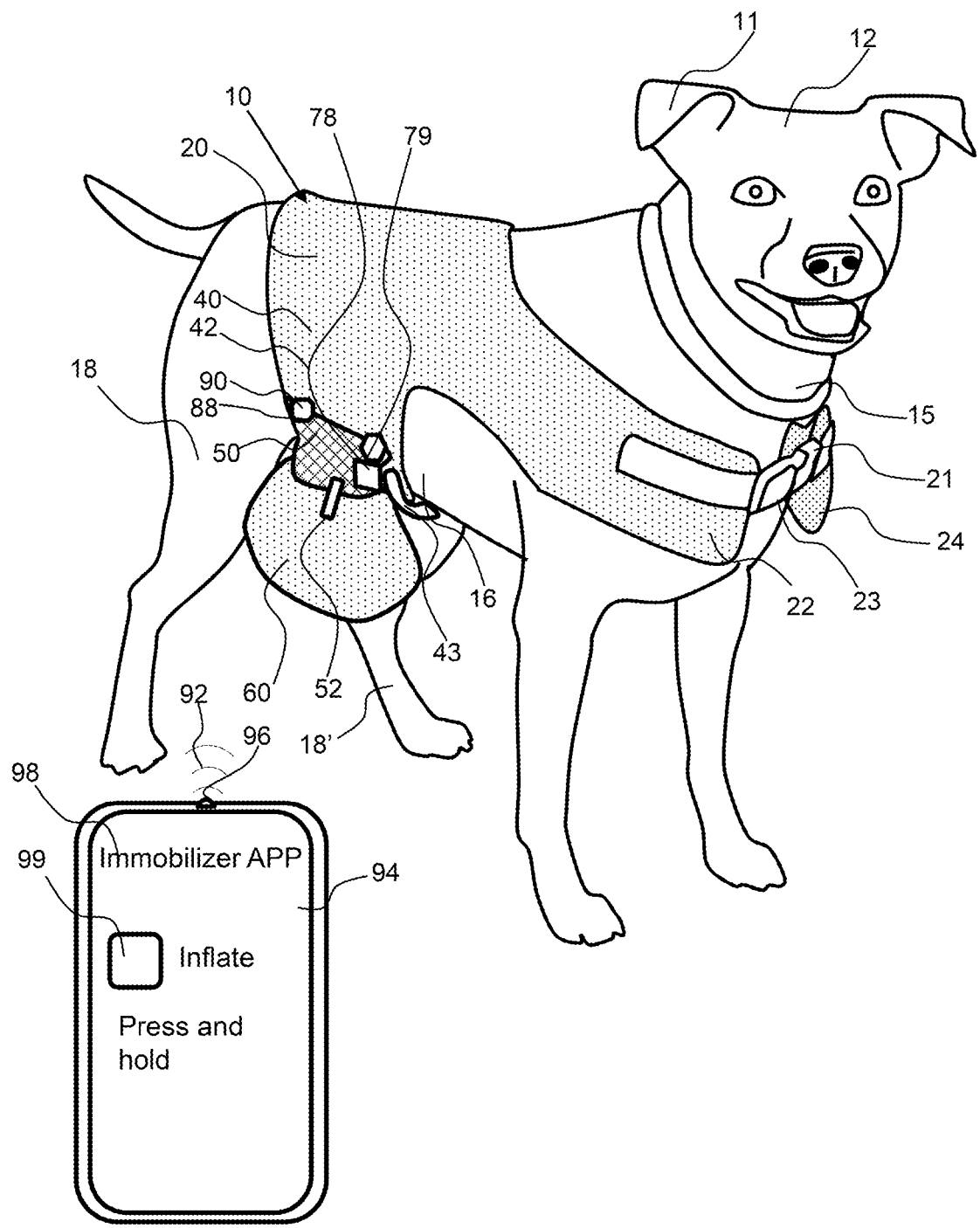
FIG. 4 shows a perspective view of a dog shown in FIG. 3 with the bladder now inflated to immobilize the dog.

Referring now to FIGS. 3 and 4, the pressure source 70 is a chemical pressure source 78, made up of two or more chemicals 77, that produces a burst of gas upon the reaction of two or more chemicals. An activator 79 may be configured to initiate the reaction of the two or more chemicals and may pierce one chemical enclosure to enable the two or more chemicals to mix and react. As shown in FIG. 4, a remote electronic device 94, such as a mobile phone, may have a user interface 98, such as an App, with an activation button 99, to initiate the inflation of the bladder. When a user interfaces with the activation button, the remote device may send a wireless signal 92 via a wireless signal transmitter 96 to the wireless signal receiver 88. The controller 90 may then open the valve 82 to inflate the bladder. A pressure regulator 80 may be configured to control the pressure of inflation of the bladder. As shown in FIG. 4, the inflated bladder is configured between the dog's back legs 18, 18'.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A pet immobilizing system comprising:
   a) a vest configured to be coupled to a pet, said vest comprising a waist portion configured to extend around a waist of said pet;
      wherein said waist portion comprises:

a first waist extension;
a second waist extension; and
a waist connector configured to detachably attach the first waist extension and the second waist extension;
b) a single bladder coupled to the vest and configured on an underside of said pet's waist and between back legs of the pet when said vest is donned on said pet;
c) a pressure source fluidly coupled to the bladder;
d) a wireless signal receiver;
e) a valve configured between the pressure source and the bladder;
f) a controller coupled with the valve and the wireless signal receiver;
g) a remote electronic device comprising:
  i) a user interface; and
  ii) a wireless signal transmitter;
wherein the wireless signal receiver receives a wireless signal from the wireless signal transmitter to initiate a flow of fluid from the pressure source to the bladder to inflate the bladder;
wherein the bladder is configured to inflate between the pet's back legs to produce an inflated bladder having a size that effectively immobilizes the pet.

2. The pet immobilizing system of claim 1, wherein the vest comprises a front extension that is configured to extend around a neck of the pet.

3. The pet immobilizing system of claim 1, where the front extension comprises a first front portion and a second front portion and a front connector configured to detachably attach the first neck portion and the second neck portion.

4. The pet immobilizing system of claim 1, wherein the pressure source is a pressure canister.

5. The pet immobilizing system of claim 4, wherein the canister detachably attachable to the vest.

6. The pet immobilizing system of claim 4, wherein the canister is coupled to the bladder by a fluid conduit.

7. The pet immobilizing system of claim 6, wherein the canister is configured proximal to a back of the pet.

8. The pet immobilizing system of claim 4, further comprising a valve configured between the pressure canister and the bladder, wherein the valve is opened to initiate a flow of gas from the pressure canister to the bladder when the wireless signal receiver receives a wireless signal from the wireless signal transmitter to initiate said flow of fluid from the pressure source to the bladder.

9. The pet immobilizing system of claim 1, wherein the pressure source is a chemical pressure source, wherein the flow of fluid is a produced by a chemical reaction of two or more chemicals of the chemical pressure source.

10. The pet immobilizing system of claim 9, further comprising an activator that mixes the two or more chemicals.

11. The pet immobilizing system of claim 1, wherein the remote electronic device is a mobile phone.

12. The pet immobilizing system of claim 11, wherein the user interface is a mobile App.

13. The pet immobilizing system of claim 1, wherein the wireless signal is a short-range wireless signal.

14. The pet immobilizing system of claim 1, wherein the bladder is configured in a bladder compartment.

15. The pet immobilizing system of claim 14, wherein the bladder compartment is closed by a bladder compartment closure that releases upon inflation of the bladder.

16. The pet immobilizing system of claim 1, wherein the fluid is air.

17. The pet immobilizing system of claim 1, wherein the bladder coupled to the vest is configured to be located on an underside of said pet's waist and between back legs of the pet and wherein the bladder is configured to inflate between the pet's back legs to immobilize the pet.

18. The pet immobilizing system of claim 1, wherein vest configured to be coupled to a dog.

* * * * *